United States Patent [19]

Hooper et al.

[11] Patent Number: 5,442,390

[45] Date of Patent: Aug. 15, 1995

[54] VIDEO ON DEMAND WITH MEMORY ACCESSING AND OR LIKE FUNCTIONS

[75] Inventors: Donald F. Hooper, Shrewsbury; Matthew S. Goldman, Marlborough; Peter C. Bixby, Westborough; Suban Krishnamoorthy, Shrewsbury, all of Mass.

[73] Assignee: Digital Equipment Corporation, Maynard, Mass.

[21] Appl. No.: 88,504

[22] Filed: Jul. 7, 1993

[51] Int. Cl.[6] ............................................. H04N 7/16
[52] U.S. Cl. ........................................ 348/7; 348/12; 455/4.2
[58] Field of Search ................. 358/86, 84; 455/2, 4.2, 455/5.1, 6.1, 4.1; H04N 7/173, 7/16; 395/425; 348/7, 6, 12, 13

[56] References Cited

U.S. PATENT DOCUMENTS

| | | | |
|---|---|---|---|
| 4,506,358 | 3/1985 | Montgoemery | 370/60 |
| 4,760,442 | 7/1988 | O'Connell et al. | 358/86 |
| 4,761,684 | 8/1988 | Clark et al. | 358/86 |
| 4,816,905 | 3/1989 | Tweedy et al. | 358/86 |
| 4,833,710 | 5/1989 | Hiroshima | 358/86 |
| 4,897,867 | 1/1990 | Foster | 455/4.2 |
| 4,920,533 | 4/1990 | Dufresne et al. | 358/86 |
| 4,949,169 | 8/1990 | Lumelsky et al. | 358/86 |
| 5,014,125 | 5/1991 | Pocock et al. | 358/86 |
| 5,019,900 | 5/1991 | Clark et al. | 358/86 |
| 5,089,885 | 2/1992 | Clark | 358/86 |
| 5,130,792 | 7/1992 | Tindell et al. | 358/85 |
| 5,142,532 | 8/1992 | Adams | 455/5.1 |
| 5,153,726 | 10/1992 | Billing | 348/719 |
| 5,168,353 | 12/1992 | Walker et al. | 358/86 |
| 5,172,413 | 12/1992 | Bradley et al. | 380/20 |
| 5,233,603 | 8/1993 | Takeuchi et al. | 370/94.1 |
| 5,247,347 | 9/1993 | Litteral et al. | 348/12 |
| 5,251,009 | 10/1993 | Reed et al. | 358/86 |
| 5,287,182 | 2/1994 | Haskell et al. | 348/500 |
| 5,341,474 | 8/1994 | Gelman et al. | 395/200 |
| 5,357,276 | 10/1994 | Banker et al. | 348/12 |

OTHER PUBLICATIONS

"IBM, AT&T Emerge Early Rivals For Video on Demand" by Stuart Zipper, Jun. 7, 1993, p. 1 5th paragraph.

Primary Examiner—James J. Groody
Assistant Examiner—Chris Grant
Attorney, Agent, or Firm—Dirk Brinkman; Ronald C. Hudgens; Arthur W. Fisher

[57] ABSTRACT

In a system for interactively viewing videos, a selected video is transmitted as a plurality of frames of digitized video data for playback on a viewing device. The system receives the transmitted video data and includes a memory buffer for storing a segment of a selected one of the videos. The segment includes a predetermined number of frames representing a predetermined time interval of the selected video. In addition, the memory buffer including a write pointer and a read pointer. Software controlled servers are provided for witting and reading video data of the selected video to and from the memory buffer, independently, at locations indicated by the write and read pointers to transfer the selected video to the viewing device. By using a remote controller the viewer can position the read and write pointers to view any portion of the selected video interactively.

10 Claims, 10 Drawing Sheets

VIDEO ON DEMAND WITH MEMORY ACCESSING AND OR LIKE FUNCTIONS

FIELD OF THE INVENTION

This invention applies to the general area of video viewing systems, and more particularly to video viewing systems which are interactive.

BACKGROUND OF THE INVENTION

There is a need to provide consumers with video services on-demand. Desirable video on-demand services can include, for example, movies, sporting events, interactive games, home shopping, textual information, and educational and arts programs, hereinafter collectively referred to as "videos". It should be understood that videos generally includes both video and audio portions, although, a video may only have an image portion as in textual information, or only an audio portion, as for example music.

Consumers would like videos of their choice to be available at times and locations convenient for them. It would be an advantage if the videos could be delivered by any transmission medium, such as commercial telephone, cable, and satellite networks. The videos should be compatible with readily available display systems, such as NTSC standard televisions, or personal computers.

Furthermore, consumers would like to have real-time, interactive VCR-like control of the videos, skipping, holding, or replaying portions at will. Home shopping and video games require a much higher level of interaction between the video and the game-player. In addition, the system used to provide video on-demand services should be scaleable at a reasonable cost to maximize the availability of the service to large populations of consumers.

A major problem with known distribution systems for video services, such as broadcast or cable television is that the consumer has no control over program or time selection. Also, known video distribution systems are limited by predetermined channel allocations in the number of different videos that are available at any one time. And, most known video services are generally not interactive.

Some video services allow for interactive videos by using specialized high-speed fiber optic cable networks. Generally such services deliver the video to the customer as one continuous uninterruptable stream. Therefore, such services generally require expensive mass storage devices and special play-back equipment at the consumer's location to provide interaction. Alternative such services require duplicate system resources at the distribution site for each of the customers, even if multiple customers are viewing the same video.

SUMMARY OF THE INVENTION

In view of the foregoing, it should be apparent that there still exists a need in the art for a method and system for interactively viewing videos without a substantial incremental costs. In a system for viewing videos interactively, a selected videos includes a plurality of frames. Each frame including digitally encoded video data, the video data representing a time sequenced image and audio signals for play-back on a viewing device, the video data are transmitted over a communications network.

The system at the receiving end of the communications network includes a memory buffer for storing a segment of a selected video. The segment includes a predetermined time interval of the selected video. In addition, the memory buffer including a write pointer and a read pointer.

Video data received over the communications network are written to the memory buffer at memory locations indicated by the write pointer while advancing the write pointer. Means, such as a remote controller, or provided to interactively position the read pointer to any of the video data stored in memory buffer. Playback of the selected video commences by reading the video data from the memory buffer at memory locations indicated by the read pointer while advancing the read pointer as the video data are read.

As an advantage, a customers can view different portions of the selected video, even though only a single relatively small sized memory is required for storing the segment. For example, if the memory buffer stores about 10 minutes of the video data, typically about 60 to 100 Megabytes, the customer can interactively and independently view any portion of the 10.

In the preferred embodiment the memory buffer is a disk storage device managed as a circular buffer. Initially, when the buffer does not contain any video data to be transferred, the video data are written at a higher rate than the rate at which the video are read for playback. Thus, the memory buffer is rapidly filled, so that requests to view different portions of the video can be fulfilled soon after transfer of the video is initiated.

In addition, an index to the memory buffer is included. Entries to the index include the time stamps of the frames stored in the memory buffer. The time stamps are associated with memory addresses of the frames when the frames are stored in the memory buffer. Thus, the viewer can select a particular portion of the video by time, and the index enables the rapid positioning of the read pointer to the particular frame by associating the time stamp with a memory address.

BRIEF DESCRIPTION OF THE DRAWINGS

These and other features and advantages of the present invention will become apparent from reading of the detailed description in conjunction with the attached drawings, wherein.

DETAILED DESCRIPTION OF THE PREFERRED EMBODIMENT

Figure 1:
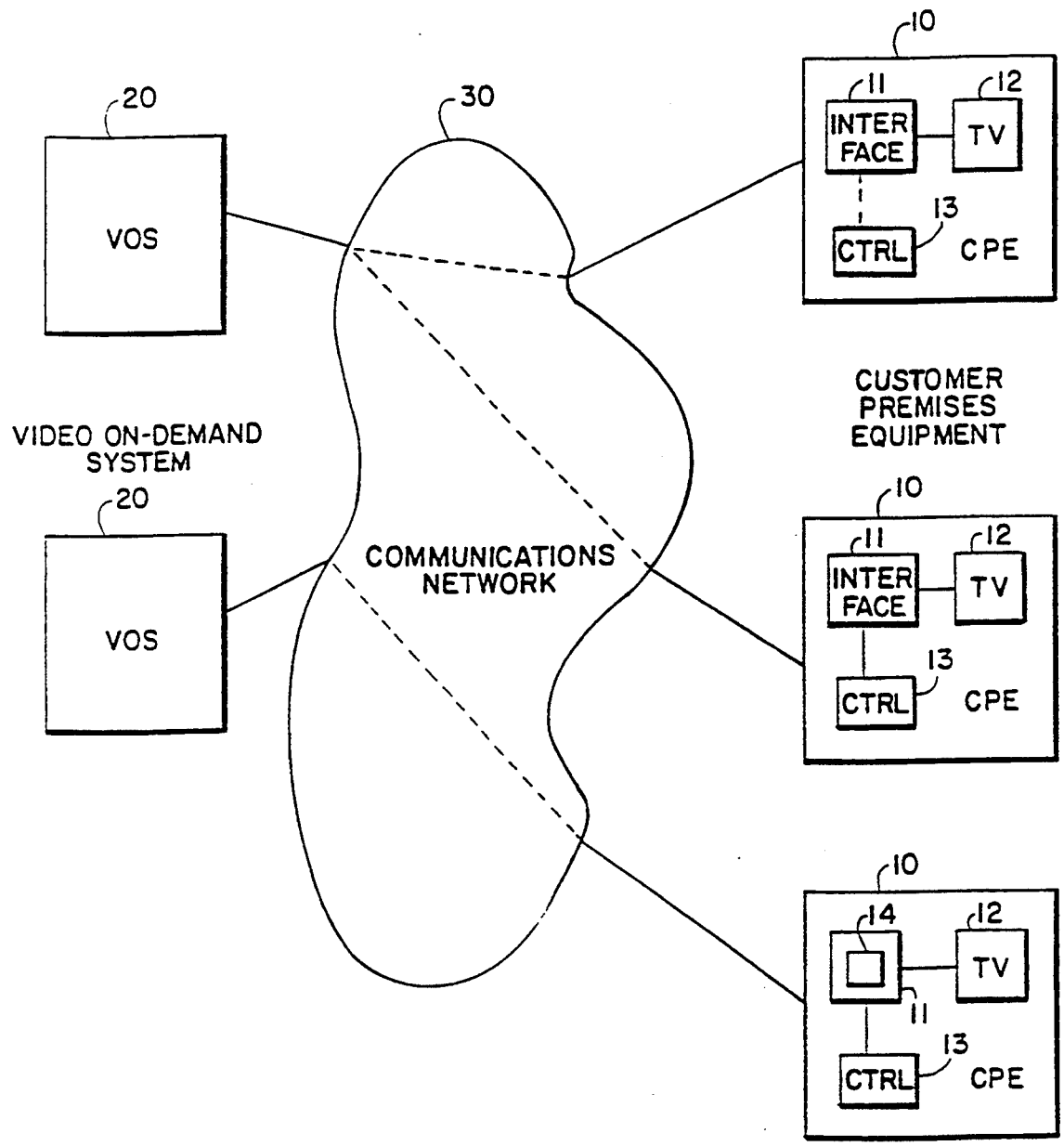
FIG. 1 is a high-level schematic view of a system for providing videos on-demand services.

Referring to FIG. 1, there is shown a system for providing videos on-demand. The system includes customer premises equipment (CPE) 10 located at sites distributed over a large geographical area, one or more centralized video on-demand systems 20, and a communications network 30. Generally, videos are transferred from the video on-demand systems 20 to the CPE 10 over the network 30. However, videos can also be transferred among the video on-demand systems 20.

The physical medium used for communicating between the video on-demand system 20 and the CPE 10 can be, for example, a twisted pair of wires, a co-axial or fiber optic cable, or a micro-wave or satellite link. The continuous physical path used for communicating is called a circuit. The circuit includes a relatively small bandwidth "bi-directional" channel for communicating control signals, and a relatively large bandwidth "downstream" channel for communicating video signals. The circuit may also include additional channels, for example, a medium bandwidth channel may be allocated for two-way communications such as plain old telephone service.

The configuration of the CPE 10 at each customer location can vary with the needs of the customer. The CPE 10 includes a network interface box 11, a viewing device 12, and a video controller 13. The interface box can include an optional customer segment cache 14.

The interface box 11 is for receiving videos to playback on the viewing device 12 via the downstream channel. The interface box 11 also communicates commands with the video on-demand system 20 via the bi-directional channel as will be explained hereinafter. Customer commands can be demands for video services. While a video is being transferred to the CPE 10, customer commands can include VCR-like control functions, such as reverse, forward, and pause, generally not available for known broadcast or cable-TV services. Moreover, customer commands for more sophisticated functions, such as jump backward or jump forward, to skip over entire portions of the video are also supported. Furthermore, specialized customer commands for controlling highly interactive videos, such as games or home shopping, are possible.

The viewing device 12 can be, for example, a monitor, a television, a VCR, or data processing equipment such as a personal computer or a work-station. The video controller 13 for entering customer commands can be configured as a hand-held remote controller for communicating with the interface box 11 by using radio or infrared signals. Alternatively, the video controller 13 can be a telephone capable of generating audible tones by pressing the dialing buttons. The optional customer segment cache 14, which will be described in greater detail hereinafter, is for locally storing portions of videos received by the CPE 10.

Figure 2:
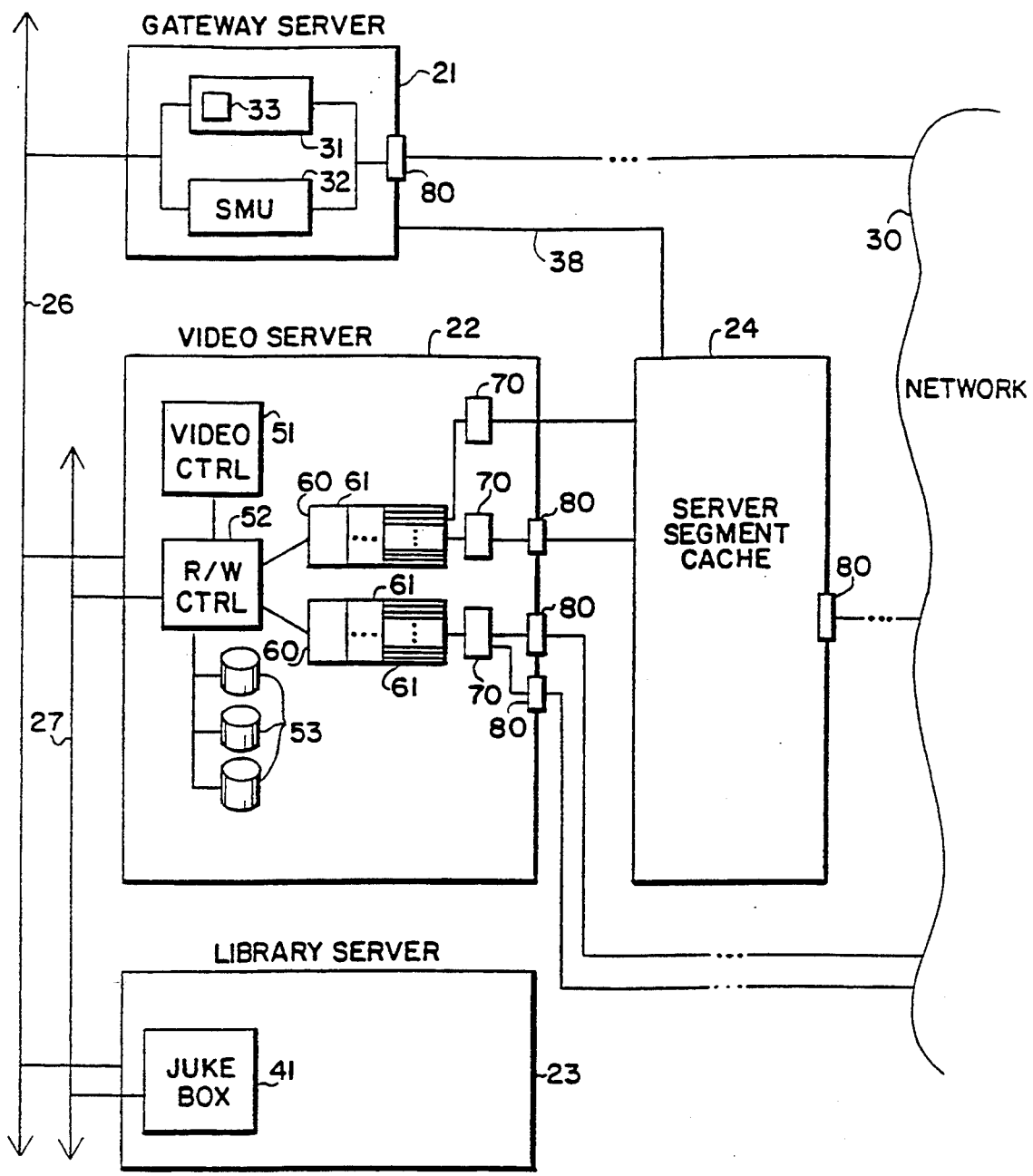
FIG. 2 is a block diagram of a video on-demand system.

FIG. 2 is a more detailed depiction of one centralized video on-demand system 20. The video on-demand system 20 includes a gateway server 21, a video server 22, a library server 23, and an optional server segment cache 24. The video on-demand system 20 also includes a plurality of communications ports 80 for interfacing with the network 30.

The gateway, video, and library servers 21-23 are connected to each other for process control by a control bus 26. The video server 22 and the library server 23 are connected to each other by a data bus 27. The servers 21-23 can be implemented as workstations, each workstation having disk and semiconductor memory for executing distributed software programs.

The optional server segment cache 24, which will be described in greater detail hereinafter, is for locally storing portions of videos to be transmitted to the CPE 10.

The gateway server 21 includes an interactive gateway unit (IGU) 31 and a server management unit (SMU) 32. The IGU 31 is for communicating commands with the CPE 10 over the network 30. The IGU 31 includes a customer database 33 for containing administrative data identifying customers. The SMU 32, in response to commands, coordinates the video server 22 and the library server 23 to deliver the selected video to the CPE 10 for viewing by the customer.

The library server 23 includes a bulk video storage system, such as a video juke box 41. The juke box 41 can be in the form of high capacity disks or tapes storing thousands of videos in encoded, compressed, and digitized form. A typical two hour compressed VHS movie requires about 1.15 Gigabytes of storage. Of course videos having higher resolutions, such as HDTV videos, may require greater amounts of storage. It should be understood that videos can be acquired for storing on the juke box 41 via the network 30 from, for example, another video on-demand system 20.

Each video server 22 includes a video server controller 51 and a disk read/write controller 52 having disks 53. By using modern high capacity disks, for example redundant arrays of inexpensive disks (RAID), a video server 22 can store over 100 Gigabytes of video data, equivalent to some one hundred full-length feature movies.

The video server 22 also includes one or more first-in, first-out (FIFO) video buffers 60 made of, for example, semiconductor dynamic random access memory (DRAM). Each buffer 60 is partitioned into a plurality of chunks 61. One chunk 61 for storing, for example, 64K bytes of video data. The size of each FIFO buffer 60 is dynamically adjustable by allocating or deallocating chunks 61 during operation.

Connected to each FIFO buffer 60 is one or more packet controllers 70. The packet controllers 70 are for reading variable sized data packets from the FIFO buffers 60.

The communications ports 80 provide the interface between the video on-demand system 20 and the network 30. It should be understood that the video on-demand system 20 can include ports 80 configured for communicating signals using methods adapted for different types of networks 30.

Two methods of communicating are used. In a first method, signals are communicated over a fixed bandwidth, point-to-point circuit which is established for the duration of the transfer between the source of the video, the video on-demand system 20 and the destination, the CPE 10.

This method of communicating can be used, for example, with the world's largest crossbar switch, the public telephone network carrying digital broadband transmission. In the United States there are about 93 million home phone connections, and about 43 million business phone connections providing access to a substantial market for video on-demand services.

The telephone network uses T1-carriers having a bandwidth of 1.544 Megabits per second (Mb/sec).

T1-carriers can readily transfer compressed motion picture videos. In North America, T2-carriers having a bandwidth of 6 Mb/sec are also available. And, T3-carriers, available at some locations, have a bandwidth equivalent to 28 T1-carriers. In Europe and elsewhere, E1-carriers support transmission rates of 2 Mb/sec.

Alternatively, in the United States, Bellcore's Asymetrical Digital Subscriber Loop (ADSL) services permits limited distance, approximately 5 kilometers, communication of digital encoded signals at T1 speed using ordinary twisted pair telephone lines. Higher data transfer rates are possible over shorter distances. A typical ADSL circuit is generally partitioned into three virtual channels, a 16 Kb/sec bi-directional channel for carrying control signals between the CPE 10 and to the video on-demand system 20, a 1.5 Mb/sec downstream channel for carrying video data signals to the CPE 10, and a 64 Kb/sec two-way communications channel for plain old telephone signals.

Alternatively, the dedicated point-to-point fixed bandwidth circuit can be a channel, or a portion of a channel of a commercial cable-TV (CATV) system. Channel here meaning a traditional 6 MHz broadcast TV channel. A typical cable system can have a capacity equivalent to hundreds of broadcast-TV channels. By using frequency and/or time division multiplexing techniques, it is possible to partition a single traditional 6 MHz CATV channel into several sub-channels to provide two-way communications and to increase the capacity of the CATV network.

In a second method, the video is transferred using a packet-switching wide area, or local area network such as are used by computer systems in the business sector. With this type of transfer, the communication signals are transferred as packets between addresses on the network. In this case, the network is shared by all potential sources (the video on-demand systems 20), and destinations (the CPE 10).

The transmission path of digital packet-switching networks typically has a very high bandwidth and can accommodate burst transmission that are many times that of the play-back speed of the compressed video. For example, an Ethernet can accommodate digital signaling rates of 10 Mb/sec, and Fiber Distributed Data Interconnect (FDDI) can accommodate rates of 100 Mb/sec. Therefore, in these type of networks, many packets can be sent between multiple sources and destinations over the same physical medium using time division multiplexing techniques.

For example, a 10 Mb/sec Ethernet can be partitioned into six 1.5 Mb/sec sub-channels. However, videos transferred over a full-capacity Ethernet would probably appear to break-up or run at a slower speed, since a minimum bandwidth can not always be guaranteed due to signaling characteristics of the Ethernet such as collisions. Therefore, the network has to be configured to operate at a lower than theoretical capacity in order to sustain continuous video play-back speed.

Figure 3:
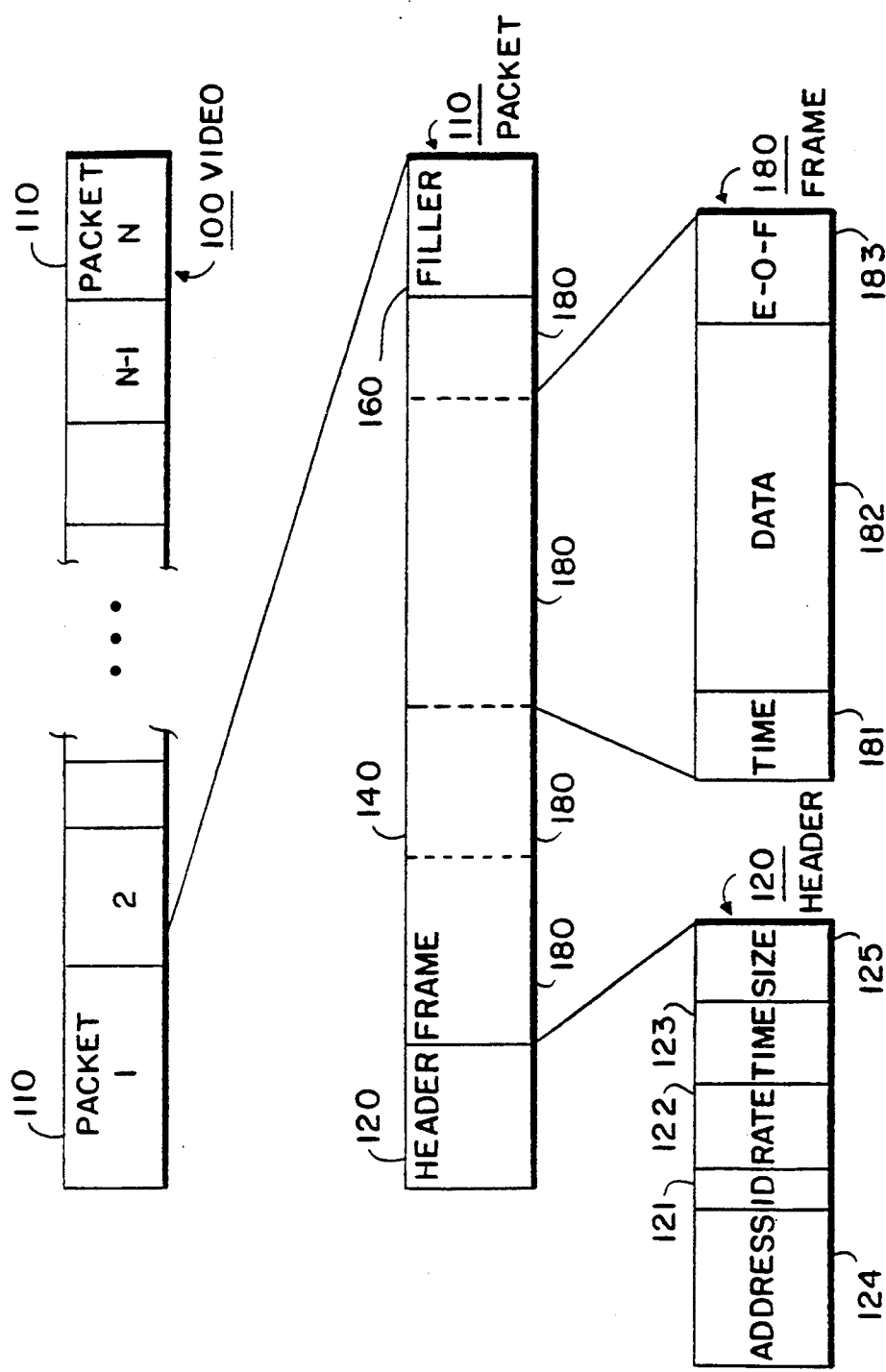
FIG. 3 is a block diagram of a video.

Now with reference to FIG. 3 the internal data structure a video suitable for transfer over the network 30 will be described. The video 100 is, for example a 1.2 GB feature length movie, having a start and an end. The data of the video 100 is in a form suitable for transfer over the network 30 by using encoding and compressing techniques, for example, the industry standard Motion Picture Expert Group (MPEG) compression algorithms. MPEG compression can reduce the video data by as much as a factor of 200 while achieving a quality comparable with known VCR videos.

The video 100 includes a plurality of packets 110, generally indicated by the numerals 1-N. The number of packets in the video is dependent on the "length" or viewing time of the video. Each packet 110 includes a packet header 120, packet data 140, and an optional packet filler 160.

The packet header 120 includes an ID 121, a RATE 122, and a TIME-STAMP 123, and a PACKET-SIZE 125. The ID 121 identifies the particular video. The RATE 122 is determined by the level of compression that is used to transform the analog signals of the video to digital data. MPEG supports varying compression rates dependent on space, time, and motion factors of the video. The TIME-STAMP 123 indicates the position of the packet data 140, time-wise, relative to the beginning of the video 100. The PACKET-SIZE 125 is used to indicate the number of data bytes of the packet 110. The PACKET-SIZE 125 is used by software that manipulates the various packets 110 to manage storage requirements.

If the video is being transferred over a packet-switched network having addressable locations the packet header 120 also includes an ADDRESS 124 to determine the destination of the packet 110. The destination corresponding to the geographical location of the CPE 10.

The packet data 140 of each packet 110 includes either digital video data or digital audio data, but not both. In a typical video, there are about seven "video" packets for every "audio" packet. The packet data 140 includes about 1 to 4 KB of encoded and compressed video or audio data. The data in the consecutive packets 110 are treated as a continuous bit stream defining the frames of the video. Typically, the frames 180 are displayed on the viewing device at a fixed rate of, for example, 30 frames per second.

Depending on the level of compression, a frame 180 can include 1 KB to 16 KB of digital data. In other words, for highly compressed portions of the video 100, a single video packet 110 may contain several frames 180. For images compressed to a lesser extent, several packet 110 may be required to compose a single frame.

A frame 180 includes a time-stamp bit sequence 181, frame data bits 182, and an end-of-frame bit sequence 183. Two types of time-stamps 181 are used with MPEG compression, a program time-stamp and a temporal time-stamp. A program time-stamp is the absolute time-wise position of the frame 180 relative to the beginning of the video 100. A temporal time-stamp indicates the time-wise offset of the frame 180 relative to a previous frame. Typically every fourth frame will have program time-stamp. The frequency of time stamping can be programmed at the time that the video is encoded and compressed.

For MPEG, three types of frames are defined: an I-frame; a P-frame; and a B-frame.

An I-frame is a "reference" frame depicting an image which is not dependent on any other frame of the video. That is, the image of the I-frame is wholly derived from the bits of the I-frame.

A P-frame is a "delta" frame representing an image derived from another frame. The P-frame contains the bits of the image which are different than the bits of the frame from which the image of the P-frame is to be derived. The P-frame typically includes a temporal time-stamp indicating the relative time-wise offset of the P-frame from the frame from which it is derived.

A B-frame is an "interpolate" frame used to create images from previous and/or following I or P frames. The B-frame can also include a temporal time-stamp.

Typically an I-Frame is larger, that is, includes more data, than a P-frame, which in turn is larger than a B-frame. The ratio of I-, to, P- to B-frames in a particular video varies greatly, depending on the encoder algorithm used, and the type of motion and detail of the images represented by the frames.

The packet filler 160 is used to assure a constant bit transmission rate at a predetermined bandwidth. For example, an MPEG compressed video, may only require a data rate of 1.2 Mb/sec in order to sustain playback of the video at normal or real-time speed. Therefore, if the communications medium can sustain a higher signaling rate, for example, 1.5 Mb/sec, the packet filler 160 supplies the "bits" for the remaining 0.3 Mb/sec capacity of the communications medium. It is possible, for example when the video is paused, that the packet contains only filler bits. However, if the video is transferred at higher than normal play-back rate, the packets 110 of the video may not include the packet filler 180.

In general, during operation of the video on-demand system 20, while a video is being transferred to a customer, the logical path which is followed by the data of the video, is referred to as a "broadcast stream." Therefore, connecting a customer to a broadcast stream means enabling the delivery of a video.

Usually, the packets 110 of the video are transmitted via the broadcast stream at play-back speed. That is, the rate of delivery of data to the CPE 10 is substantially synchronized with the play-back of the video on the viewing device 12. It should be apparent that portions of the video having different compression ratios may be delivered at differing rates.

It is also possible for the broadcast stream to operate as an outlaw broadcast stream. An outlaw broadcast stream is a stream that is transferring video data at a non-play speed to a single customer. That is, the stream is not allocated for the continuous and concurrent delivery of video data to potentially multiple customers. For example, while a customer is forwarding or reversing, have the rate of data delivery is substantially different from the normal (real-time) play-back speed of the video. Therefore, the resources required to support the outlaw broadcast stream are generally not shared among customers.

According to the preferred embodiment of the invention, resource requirements are minimized by having multiple customers share the resources of a single broadcast stream, and by eliminating outlaw broadcast stream as soon as possible. For example, by dynamically expanding the size of the FIFO buffer 60, multiple packet controllers 70 can read different portions of the same video. Thus, a single read of the video stored on the disks 53 can be viewed by multiple customers using the same FIFO buffer 60.

Figure 4:
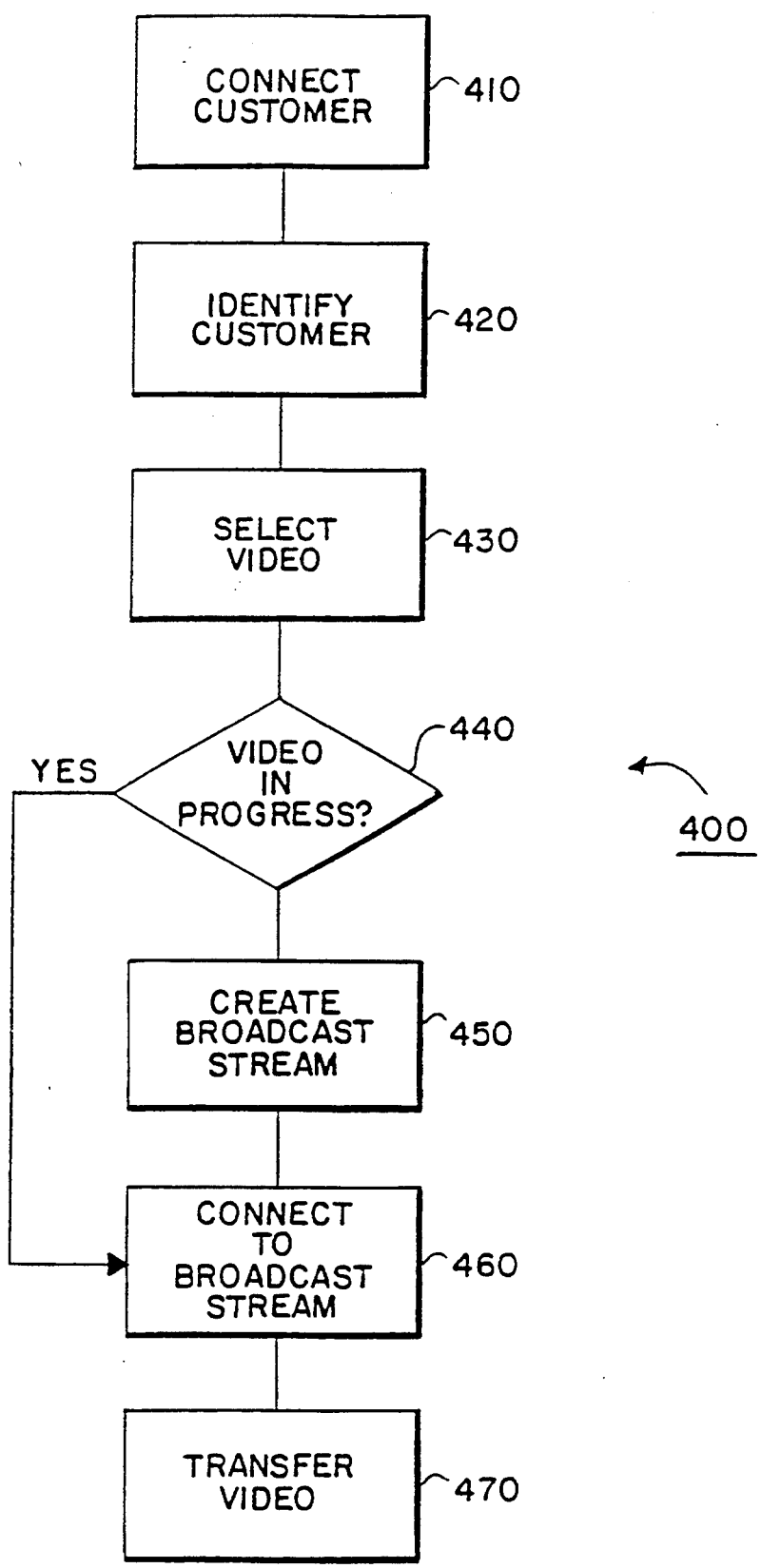
FIG. 4 is a block diagram of a procedure to request a video.

The general operation of a procedure 400 for requesting video on-demand services is described with reference to FIG. 4. In step 410, the customer connects the CPE 10 to a selected one of the video on-demand systems 20 via the network 30. The connection can be made by pressing one or more buttons on the video controller 13, for example a remote controller or a telephone. The interface box 11 connects to the video-on demand system 20 by, for example, auto-dialing, logging-on, or channel selecting, depending on the configuration of the network 30 used to reach the video on-demand system 20.

In step 420, after the connection is established, the CPE 10 is connected to the IGU 31 of the gateway server 21 for identifying the customer by using the subscriber data base 33 maintained by the gateway server 21. The subscriber data base 33 can include, in addition to billing and other administrative information, a description of the configuration of the CPE 10 so that the video on-demand system 20 can determine how to communicate with the CPE 10 of a particular customer.

In step 430, after the customer has been identified, the customer selects a video for viewing. The video is selected from a menu of available titles. The menu of available titles corresponds to the videos stored in the video juke box 41. The menu is displayed on the viewing device 12 and videos are selected with a remote controller. Alternatively, the menus are presented to the customer as voice messages, and the customer makes a selection by pushing the buttons on the telephone.

The customer may also select a particular portion of the video at which viewing should commence, that is, the "VIDEO-TIME." If the customer selects a VIDEO-TIME, the video is transferred to the customer beginning with the packet 110 having a corresponding TIME-STAMP 123. If the VIDEO-TIME is not selected, the video is shown from the beginning.

In addition, the customer can also select the "BROADCAST TIME" for the selected video. The BROADCAST-TIME is the time-of-day when the video is to be delivered. If the BROADCAST-TIME is not selected the video is delivered as soon as possible.

In step 440, at the BROADCAST-TIME, a determination is made if a broadcast stream substantially synchronous with the selected video is in progress or scheduled for broadcast. If true, continue with step 460, otherwise if false, in step 450, create the broadcast stream for the selected video.

In step 460, the CPE 10 is connected to the broadcast stream and the selected video is transferred in step 470.

Figure 5:
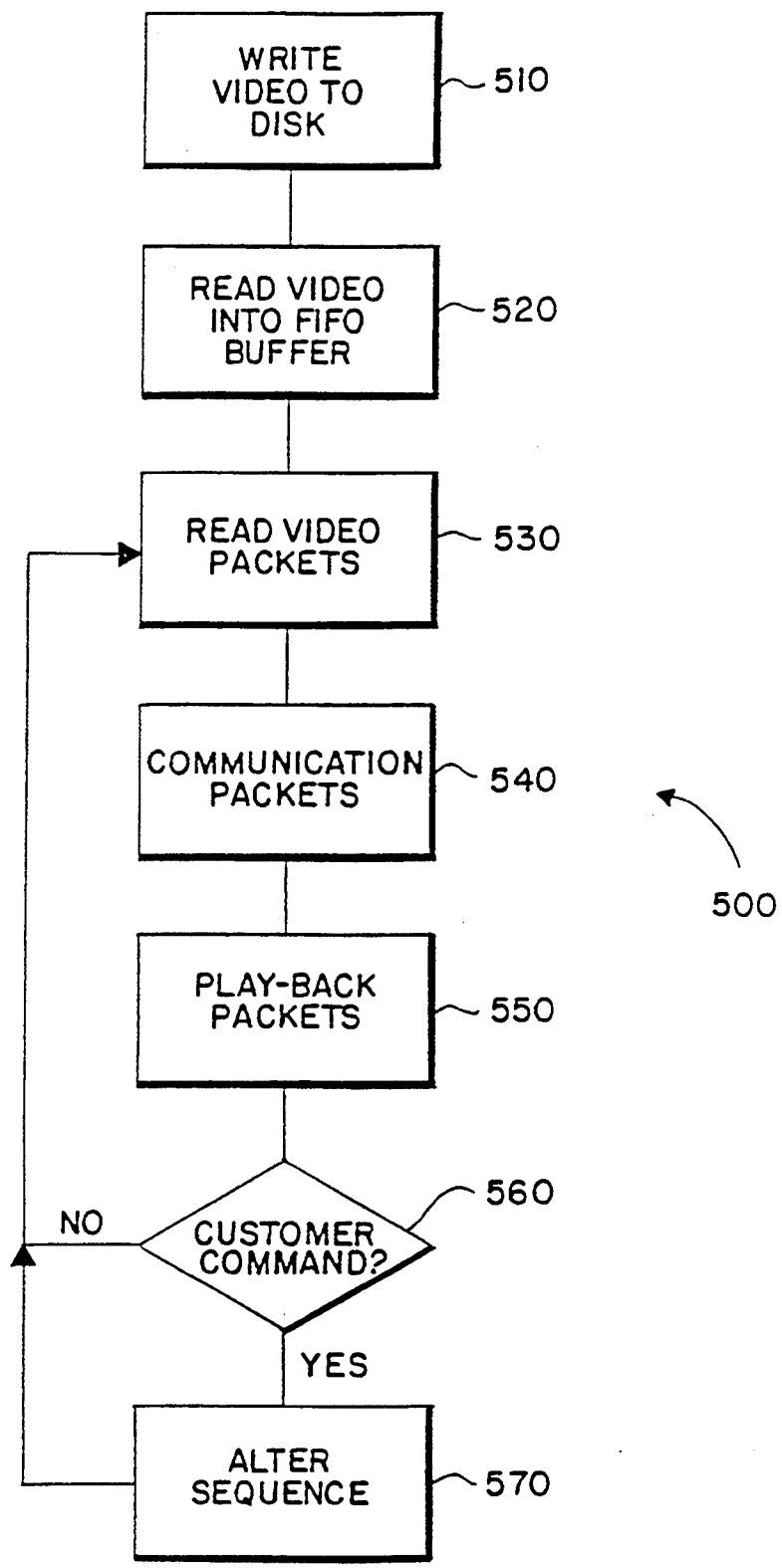
FIG. 5 is a block diagram of a procedure to transfer a video.

A procedure 500 for transferring the selected video is shown in FIG. 5. In step 510, the video server controller 51, as directed by the SMU 32, causes the disk read/write controller 52 to transfer the selected video from the juke box 41 of the library server 23 to the disks 53 via the data bus 27, if the selected video is not already stored on the disks 53. If the selected video is not stored on the juke box 41 the selected video can be acquired from another video on-demand system 20 via a high bandwidth communication circuit over the network 30 such as, for example a FDDI circuit.

In step 520, once the selected video is stored on the disks 53, the video is read from the disks 53 into the FIFO buffer 60 allocated to the broadcast stream one chunk 61 at the time. One of the purposes of the FIFO buffer 60 is for smoothing disk latencies. Another purpose of the FIFO buffer 60 is to permit multiple customers to access the same video while reading video data from the disks 53 only once.

In step 530, the selected video is read from the FIFO buffer 60 by the packet controller 70. Normally, the packet controller 70 transfers the packets 110 to the CPE 10, via the network 30, at play-back speed. That is, the packet controller 70 supplies video data for viewing at periodic intervals timed to coincide with the viewing of the data. Alternatively, the packet controller 70 can also supply video data at rates different than the playback rate.

While the most recently filled chunk 61 of the FIFO buffer 60 is being emptied by the packet controller 70, another one of the chunks 60 is being filled with the next portion of the selected video.

In step 540, the packets 110 are communicated to the CPE 10. As will be explained herein, the packets 110 are usually communicated for viewing via the segment cache, either the server segment cache 24, or the customer segment cache 14, or the expanded FIFO 60.

In step 550, at the CPE 10 the packets 110 are received. The interface box 11 parses the packet header 120, and if necessary strips the packet filler 160. The packet data 140 are decoded and decompressed into frames 180, and the frames 180 are converted to analog video and audio signals for play-back on the viewing device 12.

In step 560, while the video is being transferred, the customer can enter commands on the video controller 13 to alter the sequence of delivery of the packets 110. The commands are transmitted via the bi-directional channel of the circuit to the gateway server 21.

In step 570, if the customer enters a command, the sequence of delivery of the packets 110 is altered accordingly, otherwise continue with step 530 until the end of the video. When the video has been delivered, the customer can either select another video, or the CPE 10 is disconnected from the video on-demand system 20.

It should be apparent that as the number of customers viewing a particular popular video becomes very large, the number of broadcast stream could likewise become large, consuming valuable system resources.

Therefore, a scheme is disclosed for reducing broadcast streams and to maximize the number of customers sharing a single broadcast stream. This scheme is enabled by managing the transfer of videos in a segmented fashion. A segmented broadcast stream not only minimizes resource requirements, but in addition, enables a more sophisticated level of control over the video by the customer. Furthermore, a segmented broadcast stream makes the video on-demand system 20 realistically scaleable to service large populations spread over geographically dispersed communities.

Figure 6:
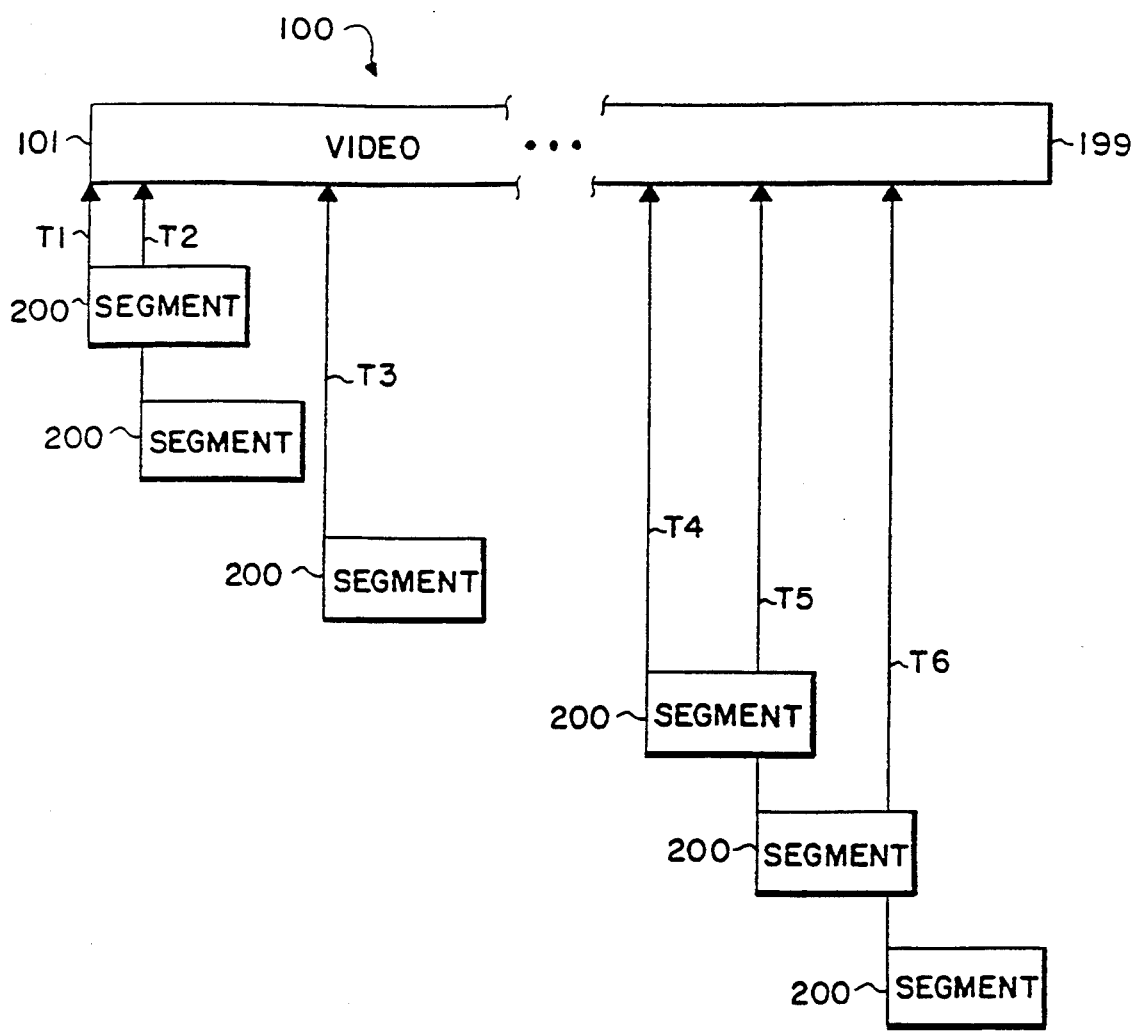
FIG. 6 is a timing diagram of a segmented video.

In the preferred embodiment of the invention, as shown in FIG. 6, the video 100 is transferred as a moving or rolling viewing window called a video segment 200 having a time-interval based span or size. The video 100 is transferred by moving the viewing window or video segment 200 forward, from the start to the end, at a substantially constant speed to coincide with the play-back speed of the video 100. However, in response to the customer commands entered on the video controller 13 the position of the moving viewing window can be altered.

In FIG. 6, the position of the moving video segment 200 is shown relative to the video 100 for various times T1 to T6, where T1 corresponds to the relative position of the video segment 200 at the beginning of the video, T2 to T5 intermediate times, and T6 corresponds to the position of the video segment 200 at the end of the video 100.

The span or size of the video segment 200 is determined by the length of the time interval of the video segment 200 multiplied by the transmission rate over the network 30. The transmission rate is determined by the compression factor at normal or real-time play speed. For example, at an MPEG compression transmission rate of 1.5 Mb/sec, if the time interval of the segment is in the order of 6 seconds, the video segment 200 includes less than a Megabyte of digitized video data. Alternatively, the video 100 can be transferred with a larger viewing window, for example, if the span of the window is, for example several minutes, the video segment 200 includes tens of Megabytes of video data.

The size of the viewing window can be adjusted to optimize for the delivery of different types of videos. For example, movies, which are generally viewed by customers from start to end, can have a viewing window sized quite differently from highly interactive videos, where the time-wise progress of the video is generally unpredictable. However, in an exemplary embodiment of the invention, the total number of viewing windows which can be active for a particular video at any one time is fixed to a predetermined number. For example, for a two hour feature length movie, the number of possible viewing windows may be fixed at 24, each window being an adjacent segment of the video. That is, segments can only be started at intervals which are multiples of five minutes, for example, at times 0, 5, and 10 minutes, relative to the beginning of the video. By fixing the number of viewing windows, the number of broadcast streams is likewise limited. Yet, with only 24 windows, a customer has, at the most, to wait only five minutes to start viewing the selected video.

In any case, the amount of data in a video segment 200 is relatively small when compared with the amount of data which can be stored on most conventional data storage devices used with data processing equipment. Disk and semiconductor memory device capable of storing, for example, a five minute video segment, about 60 Megabytes, are readily available at a relatively low cost.

According to the preferred embodiment of the invention, the current viewing window or video segment 200 is maintained in the segment cache. Thus, immediate response can be provided to any commands which reposition the video to any portion within the viewing window. It is assumed that most customer commands normally reposition the video to a nearby portions. In other words, when a customer command is to reverse, it usually is due to a desire to replay a recently viewed portion of the video.

Therefore, by having the segment cache 14 or 24, most customer commands can be processed quickly. If the customer demands to view a portion of the video not stored in the segment cache, means are provided to position the play-back to the desired out-of-window portion, and then to fast-fill the segment cache with the viewing window corresponding to the new position.

Three methods of video segment caching are disclosed. In one method, as is shown in FIG. 1, the CPE 10 includes the customer segment cache 14 for storing a single video segment 200. In another method, as shown in FIG. 2, the video on-demand system 20 includes the customer segment cache 24 for storing a plurality of video segments 200. In an alternative third method, the moving windows or video segments are generated directly from the FIFO buffers 60 by the packet controller 70. That is, the FIFO buffers 60 also serve as the segment cache. This method has the advantage that it can be implemented without requiring the expense of additional storage, however, response time may not be as quick as with a system having a dedicated segment cache 14 or 24.

In general, however, the segment cache can be located anywhere along the transmission path between the library server 23 and the viewing device 12, including interim location such as the communications network 30.

If the CPE 10 includes the customer segment cache 14, the customer can have near instantaneous interactive control of the video. However, for customers having CPE 10 not thus equipped, a slightly less responsive service can be provided by the server segment cache 24. As an advantage, the centralized customer segment cache can be concurrently shared by many customers, without any substantial increase in system overhead, particularly if large groups of customers are viewing the same videos. The exact configuration of the segment cache, centralized, or distributed may depend on market and cost considerations.

Figure 7:
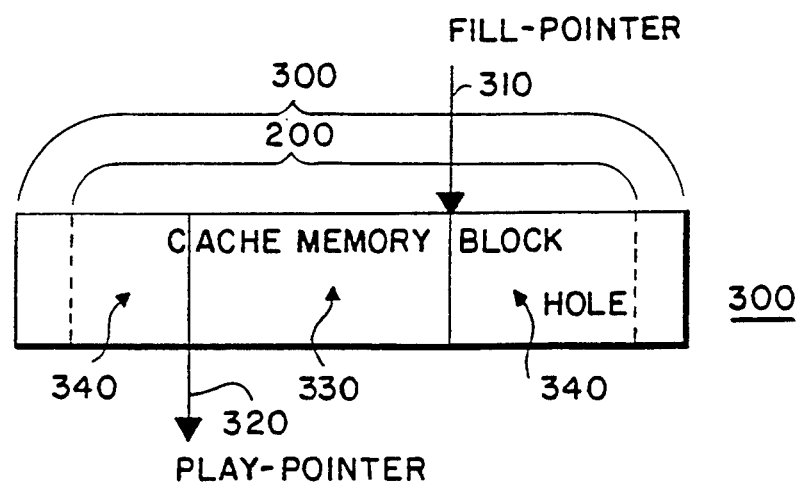
FIG. 7 is a block diagram of a segment cache.

FIG. 7 shows how the filling and the play-back of the segment cache is managed. The segment cache includes a segment cache memory block 300 sized to have a storage capacity slightly larger, for example 10%, than that which is required for storing the moving viewing window or video segment 200. By making the segment cache memory block 300 larger than the viewing window, unavoidable delays due to network traffic, or video on-demand system response time will not impede the seamless delivery of the video. The segment cache memory block can be disk or semiconductor memory.

The segment cache memory block 300 is addressable by a movable FILL-POINTER 310 and a movable PLAY-POINTER 320. The packet controller 70 writes video data in the form of packets to the segment cache memory block 300 at a location indicated by the FILL-POINTER 310. As the video data are written to the segment cache block 300 the FILL-POINTER 310 is advanced. For example, after writing an entire packet, the FILL-POINTER 310 can be advanced by adding the PACKET-SIZE 124 of the packet header 120 to the FILL-POINTER 310.

Video data for viewing is read from the segment cache memory block 300 at a location indicated by the PLAY-POINTER 320. As the video data are read from the segment memory cache 300 the PLAY-POINTER 320 is like-wise advanced.

Initially, when the segment cache memory block 300 is allocated to the broadcast stream, the FILL-and PLAY-POINTERS 310 and 320 are both pointing at locations at the beginning of the segment cache memory block 300. However, as will be explained herein, the initial filling of the segment cache memory block 300 is usually done at a rate higher than which the data are read.

Therefore, soon after the segment cache memory block 300 is placed into use, the FILL-POINTER 310 advances well ahead of the PLAY-POINTER 320. The video data ahead of the PLAY-POINTER 320 and behind the FILL-POINTER 310, generally indicated by reference numeral 330, are the video data which has not yet been viewed.

It should be understood that in an exemplary embodiment of the invention, the segment cache memory block 300 is managed as a circular buffer where the FILL- and PLAY-POINTERS 310 and 320 can wrap around from the end of the segment cache memory block 300 to the beginning, but the FILL-POINTER 310 is not allowed to over-run the PLAY-POINTER 320. The packet controller 70 is biased to fill the segment cache memory block 300 with as much of the viewing window 200 as possible. It should be understood, that if the rate of reading the cache (play-back) is the same as the rate of writing, that the PLAY- and FILL-POINTER should generally advance at about the same rate.

Although the FILL-POINTER 310 only moves in a forward direction, it is possible for the PLAY-POINTER 320 to move in a backward direction. For example, if the customer has entered a command to reverse the video, the PLAY-POINTER 320 reads packets in a reverse chronological order.

The memory locations of the segment cache memory block 300 ahead of the FILL-POINTER 320 and behind the PLAY-POINTER 310 are known as a "hole" 340. The memory locations of the hole 340 are generally available for storing new packets 110 in anticipation for viewing.

Figure 8:
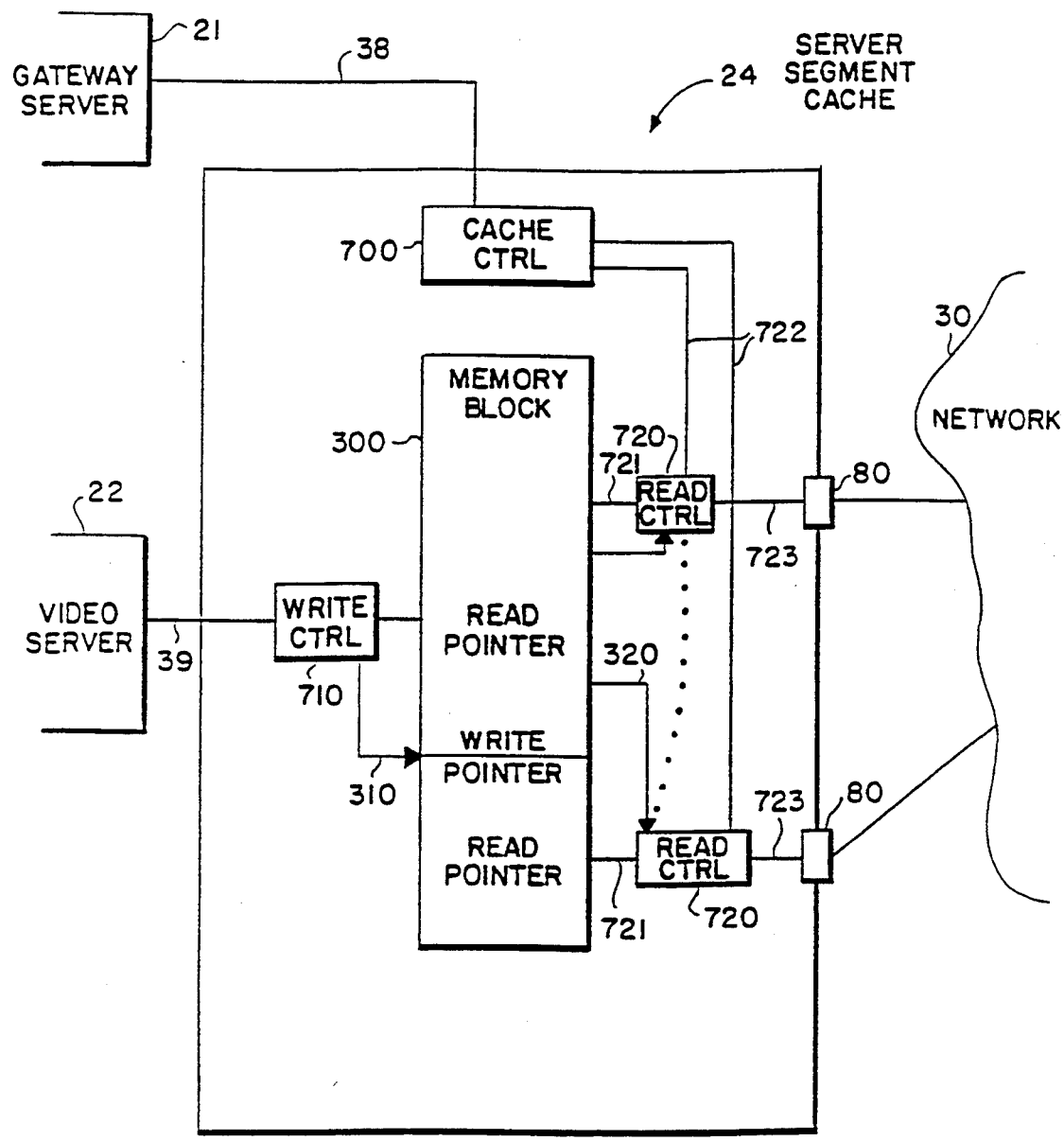
FIG. 8 is a block diagram of a server segment cache.

Now with reference to FIG. 8, the specific structure of the server segment cache 24 is described in greater detail. The server segment cache 24 includes the segment cache memory block 300, a cache controller 700, a write controller 710, and a plurality read controllers 720 connected to a corresponding number of ports 80.

The cache controller 700 is connected to the gateway server 21 via line 38 for communicating control signals. The write controller 710, via line 39, is for connecting to one of the packet controllers 70 of the video server 22 when a broadcast stream is active to communicate data signals in the form of packets 110. The write controller is connected to the segment cache memory block 300 by line 711 for writing video data to the cache memory block 300 at memory locations specified by the movable FILL-POINTER 310.

Each of the read controllers 720 is connected to the segment cache memory block 300 by a line 721 for reading video data from the segment cache memory block 300 at memory locations specified by the associated PLAY-POINTER 320. Each of the read controllers 720 is also connected the cache controller 700 by a line 722, and to the ports 80 by a line 723, respectively.

It should be understood that the video on-demand system 20 can include a plurality of server caches 24. Each server segment cache servicing a plurality of customers connected to a broadcast stream. It should also be understood that if only one customer is receiving the video on a broadcast stream, then only a single read controller 720 is active for the segment cache memory block 300. It should also be understood, that the segment cache can be by-passed completely, that is, the video segments are transferred directly from the FIFO buffers 60 to the CPE 10 by the packet controller.

Figure 9:
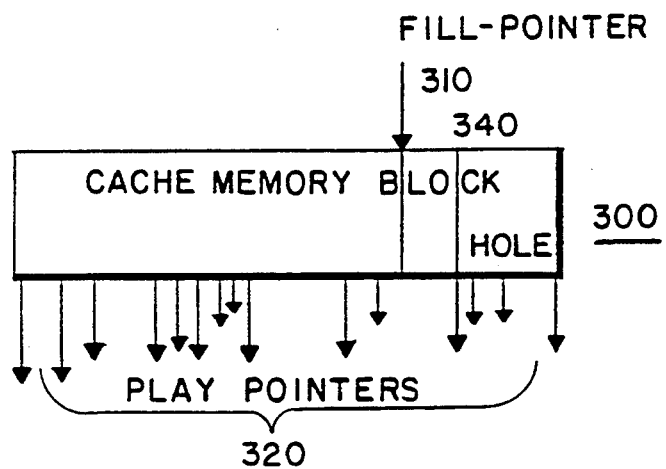
FIGS. 9 and 10 are block schematics of the segment cache operation.

The operation of the server segment cache 24 is described with reference to FIGS. 9 and 10. FIG. 9 shows the segment cache memory block 300 having a FILL-POINTER 310 and a plurality of PLAY-POINTERs 320. That is, the video data stored in the segment cache memory block 300 are being viewed by a large number of customers even though the video data for the segment cache memory block 300 are written by a single packet controller 70 at locations indicated by the FILL-POINTER 310. By synchronizing as many customers as possible to the same segment cache, broadcast stream resources can be greatly reduced. It is assumed that the PLAY-POINTERs 320 move forward or advances at a rate which is synchronous with the rate that the moving window is advancing during real-time or normal playback of the video. The rate at which the viewing window moves forward is determined by the rate at which the FILL-POINTER 310 is advanced by the writing of the segment cache.

Figure 10:
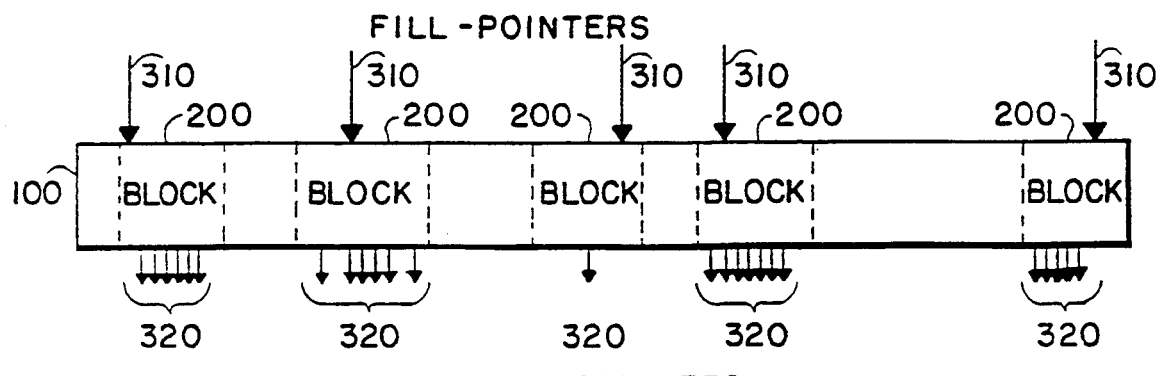

As shown in FIG. 10, the number of broadcast streams is kept to a minimum, for example five, by synchronizing as many customers, generally indicated by the PLAY-POINTERs 320, to as few sliding window video segments 200 as possible. Furthermore, the delivery of videos by the packet controller 70 of the video on-demand system 20 is biased to get an out-of-sync viewer onto one of the common broadcast streams.

An out-of-sync viewer is synchronized by identifying a target broadcast stream having a FILL-POINTER time-wise near the FILL-POINTER of the out-of-sync broadcast stream. Once a target broadcast stream is identified, the out-of-sync broadcast stream writes to its segment cache at a faster data rate until the FILL-POINTERs are coincident. Coincidence of PLAY-POINTERs can be determined by comparing the timestamps of the broadcast streams. While in fast-fill mode, it is permitted for the FILL-POINTER to overrun the target broadcast stream by a small amount.

After the FILL-POINTER of the out-of-sync broadcast stream has caught up with the target broadcast stream, the video delivery of the two broadcast streams is essentially synchronized, and the out-of-sync broadcast stream can be collapsed into the target broadcast stream.

Figure 11:
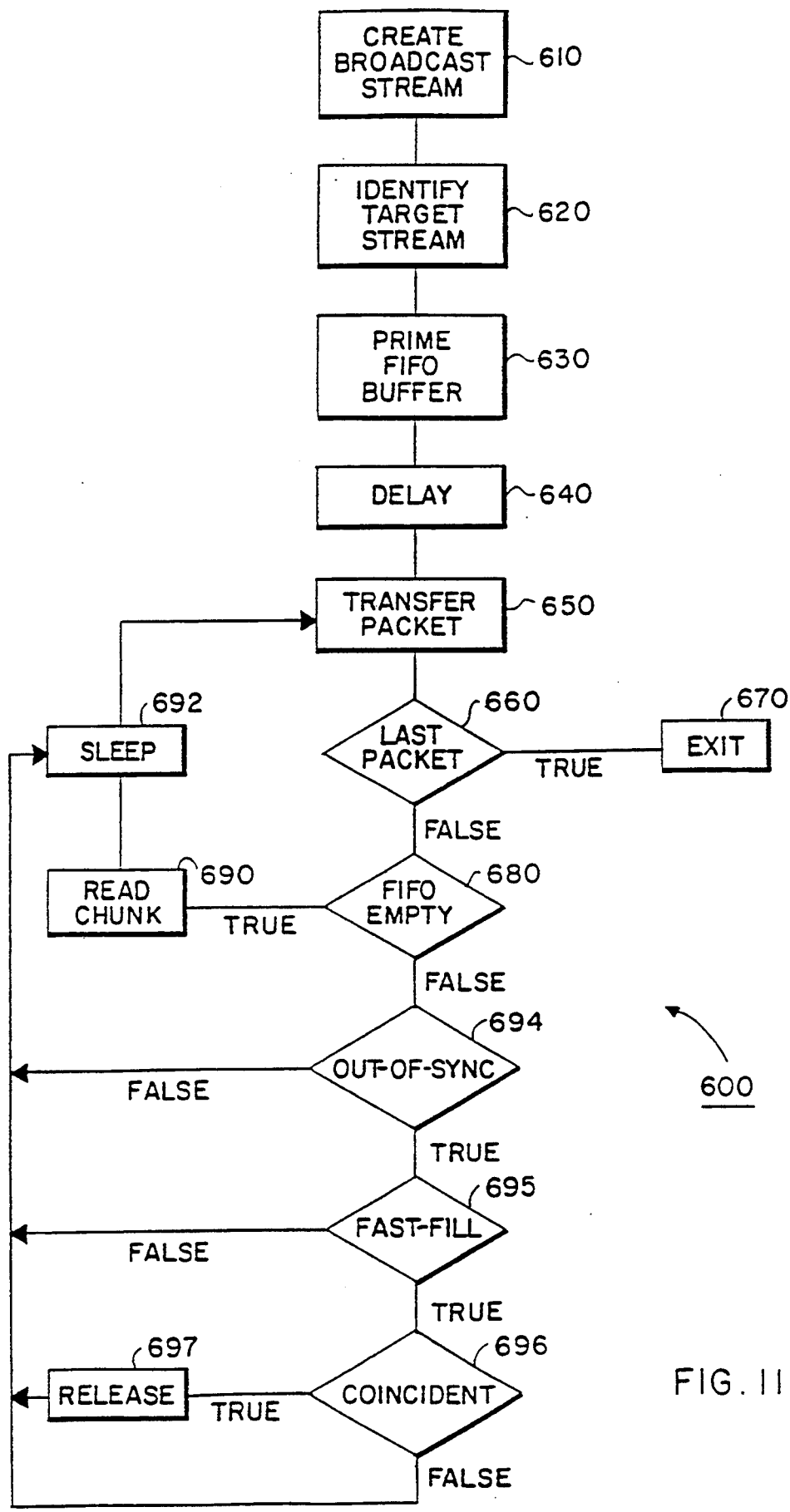
FIG. 11 is a block diagram of a procedure for managing segmented broadcast streams.

FIG. 11 shows the steps of a procedure 600 for managing and synchronizing broadcast streams. In step 610, a broadcast stream is created. During this step a FIFO buffer and a segment cache are allocated. In step 620, a target broadcast stream is identified. In step 630, the FIFO buffer is primed with video data read from the disks by the disk read/write controller. In step 640, further processing may be delayed if the customer has requested delayed delivery of the video.

In step 650, a next packet 110 is read from the FIFO buffer by the packet controller. The packet 110 is transferred to the segment cache at a location indicated by the FILL-POINTER.

In step 660, a determination is made if the next packet is the last packet of the video. If true, in step 670 terminate the broadcast, release resources, and disconnect the CPE. During this step billing information is updated in the customer database.

Otherwise if false, in step 680 a determination is made if the reading of the next packet causes a chunk of the FIFO buffer to be empty. If true, in step 690 read the next chunk of the video data from the disks and proceed with step 692.

In step 692, the video server is, for example, suspended, until a timer or channel interrupt is detected for the next packet. Upon detection of the interrupt continue with step 650.

Otherwise, if the determination in step 680 is false, in step 694 it is determined if the broadcast stream is an out-of-sync broadcast stream, if false, continue with step 692.

Otherwise, if the determination in step 680 is true, in step 695, a determination is made if the out-of-sync broadcast stream is fast-filling. If the determination in step 695 is false, continue with step 692.

Otherwise, if the determination in step 695 is true, in step 696, a determination is made if the broadcast streams are now coincident. If the determination in step 696 is false, continue with step 692.

Otherwise, if the determination in step 696 is true, in step 697 connect the CPE 10 to the target broadcast stream at normal play-back speed, and release the resources of the out-of-sync broadcast stream, continue with step 692.

Figure 12:
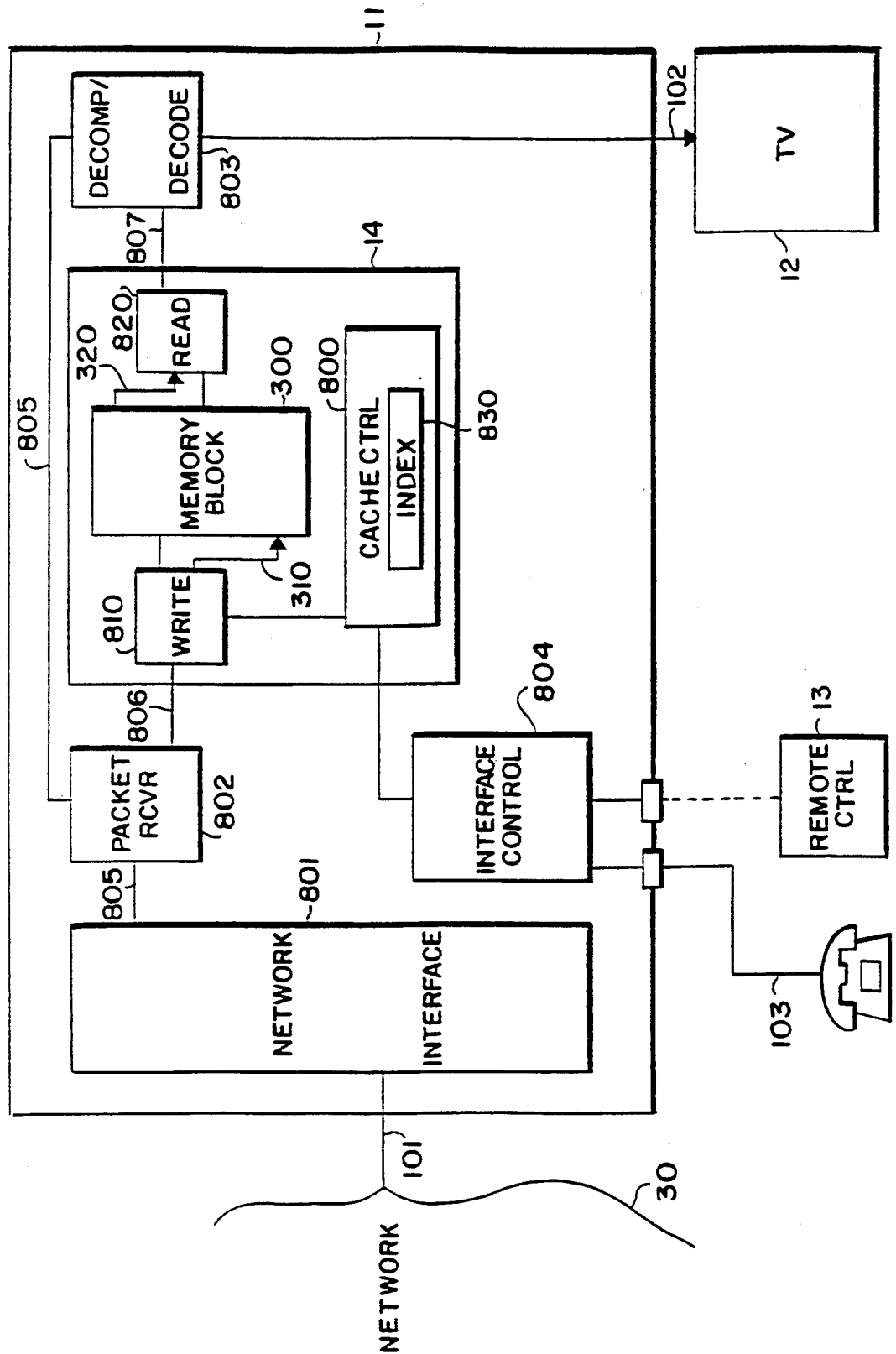
FIG. 12 is a block diagram of a customer segment cache.

Now with reference to FIG. 12, an alternative embodiment of implementing the segment cache is described. FIG. 12 shows the CPE 10 including the interface box 11 connected to the communications network by line 101, and the viewing device 12 connected to the interface box 11 by line 102. Also shown is the video controller 13, and an optional telephone 15 connected to the interface box 11 by line 103.

The interface box 11 communicates with the network 30 via line 101 using digital encoded signals. Line 101 can be a twisted pair local loop connected to a telephone central office, or a cable drop connected to a cable network. The interface box 11 transmits analog video and audio signals to the viewing device 12 via line 102.

The interface box 11 includes a network interface 801, a packet receiver 802, a decompressor/decoder 803, and an interface controller 804. Also shown is the optional customer segment cache 14, connected between the packet receiver 802 and the decompressor/decoder 803.

A by-pass line 805 directly connecting the packet receiver 802 to the decompressor/decoder 803 is used for a configuration of the interface box 11 not equipped with the customer segment cache 14. The by-pass circuit is also used when the broadcast stream is not in play-back mode, for example, during the processing of non play-back commands such as forward, and reverse.

The network interface 801 is for managing the signal separation on the virtual channels of the circuit between the interface box 11 and the video on-demand system 20. The data signals received on the downstream channel are forwarded from the network interface 801 to the packet receiver 802 via line 805.

If the interface box 11 does not include the customer segment cache 14, video signals in the form of packets 110 are received at regular timed intervals to coincide with the normal play-back speed of the video. The packet receiver 802 parses the packet header 120, and strips the packet filler 160, if necessary.

The packet data 140 are passed to the decompressor/decoder 803, where the packet data 140 are broken down to frames 180, and the data in the frames are converted to, for example, standard NTSC broadcast signals suitable for display on the viewing device 12 via line 102. The decoder/decompressor 150 can also be configured to translate the video data 302 to video signals in conformance with high-definition TV (HDTV) or a monitor of a personal computer (PC). The decompressor/decoder 803 includes a local buffer to store compressed data before conversion to analog signals.

The customer controls the play-back of the video with the video controller 13, for example, a remote controller. By pressing buttons on the video controller 13, the customer can request the delivery of the video, and while the video is being played-back, the customer can manipulate the sequence of the frames of the video.

Commands which change the display sequence include forward, reverse, jump, and the like. The jump command, which is generally not available with known video on-demand services, allows the customer to start viewing at essentially any time position of the video. While the customer is viewing a video game or other services such as home shopping, the commands are especially tailored for the particular video being delivered. The commands indicated on the remote controller are transmitted to the interface controller 804 by, for example, infrared, or radio signals. Alternatively, the commands are entered by using the dialing buttons of the telephone.

The interface controller 804 decodes the commands and converts the command into digital signals to transmit to the video on-demand system 20 on the bi-directional channel of the circuit.

The optional customer segment cache 14 includes the segment cache memory block 300, a cache controller 800, a write controller 810, and a read controller 820. In the preferred embodiment of the invention, the memory block 300 is a small form factor disk drive, similar to the disk drives that are used with personal computers. A typical customer segment cache 14 would have storage in the range of about 100 Megabytes, that is, large enough to store a moving window of having a span of several minutes. The disk drive, as previously discussed, is managed as a circular buffer.

The write controller 810, is connected to the packet receiver via line 806 for receiving packet data 180. The write controller 810 is connected to the segment cache memory block 300 for writing video data to the segment cache memory block 300 at memory locations specified by the movable FILL-POINTER 310. The read controller 820 reads packet 180 from the cache memory block 300 at locations indicated by the PLAY-POINTER 320 via line 807. The cache controller 800 manages the writing and reading of the cache memory block 300. The operation of the cache controller 800 is similar to that described for the cache controller 700 of the server segment cache 24, that is, the cache memory block is managed as a circular buffer. However, it should be apparent that the customer segment cache 14 only has a single PLAY-POINTER 320.

The cache controller 800 also is capable of generating commands for managing the delivering of the video. That is, the cache controller 800 generates a command to fill the segment cache with a new viewing if the customer attempts to position the PLAY-POINTER 320 out of the cache. Also, a cache near-empty condition will cause the cache controller 800 to generate a command for the video server to deliver additional packets. Commands generated by the cache controller are communicated to the video server 22 via the bi-directional channel of the communications circuit.

A safety zone, for example ten seconds, is maintained around the PLAY-POINTER 320. That is, the cache controller 800 uses look-ahead while manipulating the PLAY-POINTER 320 in order to anticipate any condition which may cause the PLAY-POINTER 320 to collide with the FILL-POINTER 310, or which may cause the PLAY-POINTER 320 to reach a cache boundary, or any other condition which may require attention of the video server 22. By having a safety zone, any short term delays in the video server 22, to process commands related to managing the PLAY-POINTER 320 can be tolerated, without interrupting the seamless delivery of the video. The cache controller 800 includes a cache index 830. The cache index 830 links the packet time-stamps to the cache memory addresses where the corresponding packets are stored. The cache index is dynamically created as the cache memory block is filled with video data. Thus, the user can request to start viewing by specifying, for example, a time off-set from the current viewing position. The cache controller 800 computes a corresponding cache memory address, and determines if that requested video portion is stored in the cache. If it is, viewing can commence immediately at the requested position, otherwise, a command is communicated to video on-demand system 20 to begin delivery of the video at the requested position.

Of course, the present invention is not intended to be restricted to the particular arrangements of the video on-demand system and the customer premises equipment of the embodiments disclosed herein. Nor is the present invention intended to be restricted to any specific use. The apparatus and methods disclosed are intended only for illustration and for disclosure of an operative embodiment, and not to show all of the various forms of modification in which the invention may be embodied or operated.

Therefore, the invention is not necessarily limited to the particular embodiment shown herein. It is to be understood that various other adaptations and modifications may be made within the scope of the claimed invention.

What is claimed is:

1. A system for interactively viewing a selected one of a plurality of videos, the selected video including a plurality of frames, each frame including digitally encoded video data and a time stamp, the video data representing time sequenced image signals and audio signals for play-back on a viewing device, a communications network for transmitting the video data, comprising:

means for requesting the transmission of the selected video on the communications network;

a network interface, coupled to the communications network for receiving the selected video as a first stream of video data;

a memory buffer, coupled to said network interface, for storing a segment of the selected video, said segment including video data of a forward moving time interval of the selected video;

a write pointer, coupled to said memory buffer, associated with said first stream of video data to be written to said memory buffer;

a read pointer, coupled to said memory buffer, associated with a second stream of video data to be read from said memory buffer;

means coupled to said write pointer, for writing said first stream of video data to said memory buffer while receiving the selected video;

means, coupled to said read pointer for reading said second stream of video data from said memory buffer while writing said first stream of video data, said means for reading operating independently from said means for writing, to display any video data of said segment of the selected video on the viewing device while receiving said first stream of video data: and an index for associating the time stamps of the frames with memory addresses of said memory buffer where the frames are stored.

2. The system as in claim 1 wherein said memory buffer is a circular buffer, said means for writing to advance said write pointer to the beginning of said circular buffer upon reaching the end of said circular buffer, said means for reading to advance said read pointer to the beginning of said circular buffer upon reaching the end of said circular buffer, and said means for writing to overwrite a particular video data after said particular video data has been read.

3. The system as in claim 1 wherein said means for writing fills said memory buffer with video data of the selected video at a different rate than reading the video data.

4. The system as in claim 3 wherein said different rate is higher than said rate of reading when said memory buffer is not full.

5. A method for interactively viewing a selected one of a plurality of videos, the selected video including a plurality of frames, each frame including digitally encoded video data and a time stamp, the video data representing time sequenced image signals and audio signals for play-back on a viewing device, transmitting the video data over a communications network, comprising the steps of:
  requesting the transmission of the selected video on the communications network;
  receiving the video data over the communications network as a first stream of video data;
  storing a segment of the selected video in a memory buffer, said segment including a substantially forward moving time interval of said first stream of video data of the selected video, said memory buffer including a write pointer and at least one read pointer;
  writing said first stream of video data of the selected video to said memory buffer at said write pointer;
  reading a second stream of video data from said memory buffer at said at least one read pointer while writing said first stream of video data to display any video data of said segment of the selected video on the viewing device while receiving said first stream of video data; and
  indexing the stored video data by the time stamps.

6. The method as in claim 5 further including the steps of selecting a particular frame of said selected video, and writing the video data to said memory buffer as said first stream of video data beginning with said particular frame.

7. The method as in claim 5 wherein said memory buffer is a circular buffer, said writing step to advance said write pointer to the beginning of said circular buffer upon reaching the end of said circular buffer, said reading step to advance said read pointer to the beginning of said circular buffer upon reaching the end of said circular buffer, and overwriting a particular video data after said particular video data has been read.

8. The method as in claim 5 including filling said memory buffer with the video data of the selected video at a higher rate than reading the video data when said memory buffer is not full.

9. A method for viewing videos, comprising:
  requesting distribution of a video over a communications network as a first stream of video dam;
  receiving said first stream of video data from said communications network;
  writing, while receiving, said first stream of video data in a buffer as a substantially continuously forward moving time interval of said video data, and
  reading, independent of said writing, a second stream of video data from said buffer while receiving said first stream of video data;
  converting said second stream of video data to video signals; and
  displaying said video signals on a viewing device while receiving said first stream of video data; and
  reading said second stream of video dam from said buffer in a reverse chronological order while receiving said first stream of video data in a forward chronological order.

10. The method as in claim 9 further comprising reading said video data at a different rate than writing said video data.

* * * * *

UNITED STATES PATENT AND TRADEMARK OFFICE
CERTIFICATE OF CORRECTION

PATENT NO. : 5,442,390  Page 1 of 1
APPLICATION NO. : 08/088504
DATED : August 15, 1995
INVENTOR(S) : Hooper et al.

It is certified that error appears in the above-identified patent and that said Letters Patent is hereby corrected as shown below:

On Title Page Item [57]   ABSTRACT

Delete "witting" and insert --writing--

Claim 9, column 18, line 17

Delete "dam" and insert --data--

Claim Claim 9 column 18, line 30

Delete "dam" and insert --data--

Signed and Sealed this

Twentieth Day of March, 2007

JON W. DUDAS
*Director of the United States Patent and Trademark Office*